United States Patent [19]
Anderson

[11] 4,098,242
[45] Jul. 4, 1978

[54] AUTOMATIC CONTROL SYSTEM WITH GAIN SWITCHING

[75] Inventor: George H. Anderson, Rockford, Ill.

[73] Assignee: Barber-Colman Company, Rockford, Ill.

[21] Appl. No.: 696,897

[22] Filed: Jun. 17, 1976

[51] Int. Cl.² .............................................. F02D 11/10
[52] U.S. Cl. ..................................... 123/102; 123/118
[58] Field of Search ..................... 123/102, 118, 180; 180/105 E; 318/609, 638, 610, 611, 630

[56] References Cited
U.S. PATENT DOCUMENTS

| | | | |
|---|---|---|---|
| 2,759,135 | 8/1956 | Albrecht et al. | 318/611 |
| 2,806,192 | 9/1957 | Bristol | 318/610 |
| 3,100,277 | 8/1963 | McCullough | 318/611 |
| 3,722,614 | 3/1973 | Sakakibara et al. | 180/105 E |
| 3,820,624 | 6/1974 | Sakakibara | 123/102 |
| 3,878,915 | 4/1975 | Purland et al. | 123/102 |
| 3,886,921 | 6/1975 | Hafner | 123/102 |
| 3,900,013 | 8/1975 | Vignozzi et al. | 123/102 |
| 3,915,130 | 10/1975 | Hobo et al. | 123/102 |
| 4,036,323 | 7/1977 | Schmall | 123/102 |

*Primary Examiner*—Charles J. Myhre
*Assistant Examiner*—R. A. Nelli
*Attorney, Agent, or Firm*—McDougall, Hersh & Scott

[57] ABSTRACT

An automatic control system wherein repetitive pulses, the frequency of which is responsive to a remote condition, such as prime mover RPM, are converted to a DC voltage level. The voltage level is compared to a reference by a difference amplifier to produce an error signal. Further signals are produced from the error signal which are ultimately used to control the remote condition. The gain of the amplifier is externally adjustable depending upon conditions relating to the prime mover load conditions.

10 Claims, 3 Drawing Figures

AUTOMATIC CONTROL SYSTEM WITH GAIN SWITCHING

BACKGROUND OF THE INVENTION

This invention relates generally to automatic control systems. More specifically, it relates to electric control systems wherein the control signals utilized are combined functions of a proportional signal and the integral and derivative thereof.

Automatic control systems are known in the art. Such systems receive electrical signals representative of a condition of an element to be controlled and compare that signal with a reference to produce an error signal. A particular application of such control systems has been as governors controlling the speed (RPM) of internal combustion engines.

In many applications it is desired to control engine RPM to maintain constant speed in spite of variations of engine load. It is desirable to provide a system wherein the transient response, that is, the response time of the engine and the control system, due to a change in operating conditions, is minimized. This avoids over speed, hunting and instability conditions potentially damaging to the system.

An automatic control system having the characteristics desired for the aforementioned uses is disclosed in co-pending U.S. Pat. application Ser. No. 538,133 filed Jan. 2, 1975, now U.S. Pat. No. 4,070,609 and assigned to the present assignee. In that application, which is hereby incorporated by reference, an automatic control system is described in which engine speed is sensed by a magnetic pickup coil. After wave shaping and amplification the wave form is applied through an isolating switch arrangement to the input of an operational amplifier. This amplifier compares the average DC level against a reference to generate an error signal. The error signal is then differentiated and integrated with respect to time. A signal proportional to the error signal, its integral and its derivative are combined to produce a control signal for operating an actuator device coil. Various protective circuits are incorporated in the controller, such as, a current limiter and a fault detector for determining engine failure. By use of a feedback element associated with the actuator, accurate control over that device is obtained.

The gain of the automatic control system or, more specifically, the gain of the difference amplifier which generates the error signal must be selected according to the characteristics of the prime mover. These characteristics include system inertia, operating speed, rated horsepower, loading, and the like. If the gain is too high for a given application, the automatic control system will hunt, i.e., alternatively overshoot and undershoot its desired set point and in severe cases become increasingly unstable. In the case of too little gain from the error signal amplifier, the desired constant RPM cannot be maintained with sufficient accuracy. That is, the transient response is too long.

A special problem is produced where the characteristics of the prime mover change significantly during a period of operation. Under those circumstances, it is necessary to alter the gain of the difference amplifier for each set of operating conditions if maximum performance is to be obtained.

It is accordingly an object of the invention to provide a novel automatic control system which is sensitive to variations in a controlled element to maintain a desired condition.

Another object of the invention is to provide a control system which is responsive to changes in the external operating characteristics of the controlled prime mover for altering the system gain.

A further object of the invention is to provide a control system in which the system gain is switchable according to the load conditions of the prime mover being regulated.

Another object of the invention is to provide a control system which is particularly effective for controlling the speed of internal combustion engines so as to conserve fuel, accurately maintain a desired speed, and prevent engine run away.

Other objects and advantages of the invention will be apparent from the remaining portion of the specification.

BRIEF DESCRIPTION OF THE DRAWINGS

FIG. 3 is a schematic representation of a typical application of the control circuit according to the invention.

DETAILED DESCRIPTION

Figure 1:
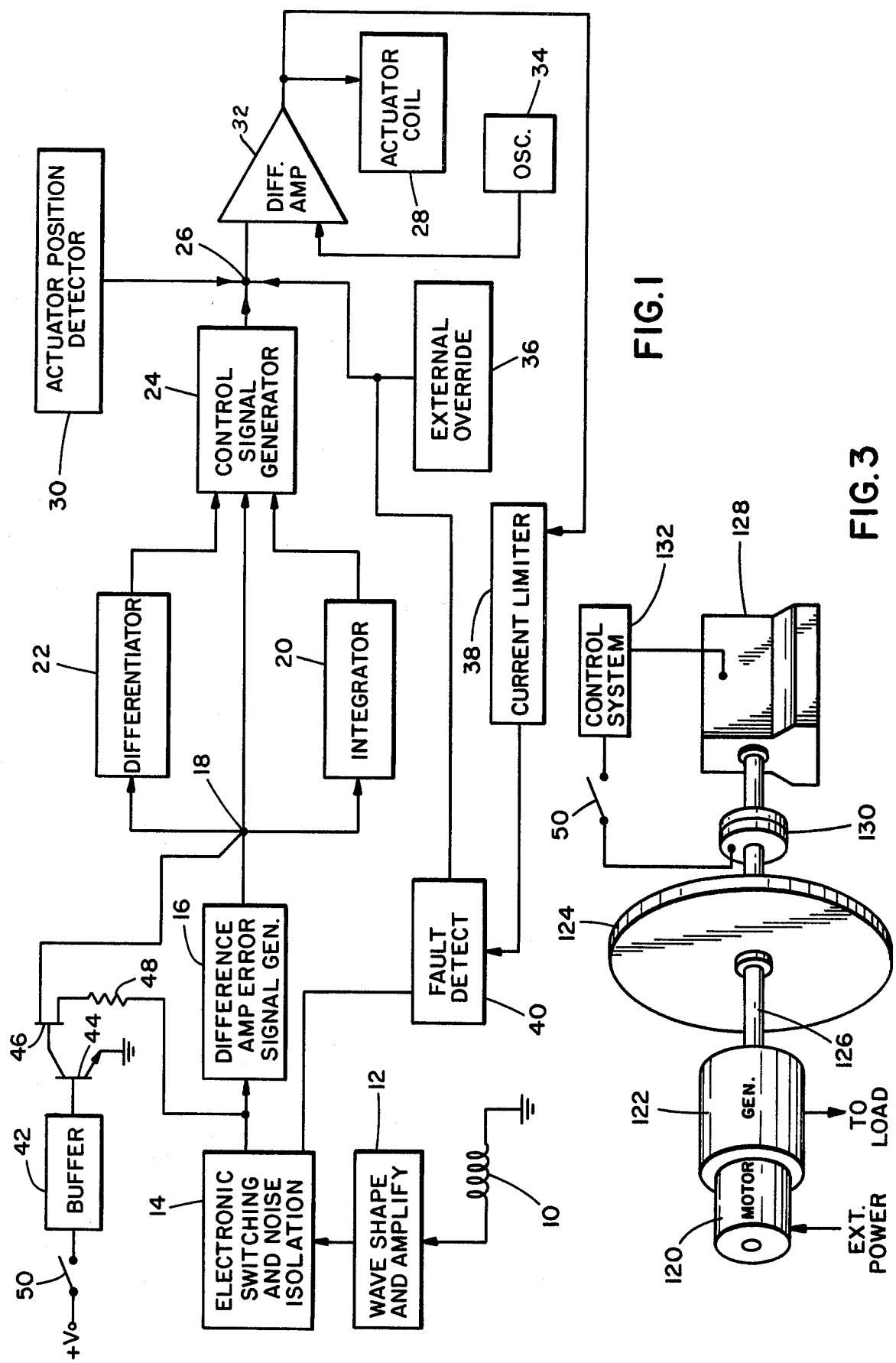
FIG. 1 is a block diagram of an automatic control system according to the present invention.

Referring to FIG. 1, a block diagram of the control system according to the invention is illustrated. As indicated in the background portion, the basic control system is that disclosed and described in detail in U.S. Pat. application Ser. No. 538,133. That application, which has been incorporated herein by reference, is referred to for the specific circuit details of the indicated blocks not otherwise discussed in the present application.

The RPM of a prime mover, such as a diesel engine or similar internal combustion engine, is detected by a magnetic pick-up coil 10. The sinusoidal wave form produced by the coil is received by a wave shaping and amplifier circuit 12 which produces square wave pulses therefrom. The series of pulses, the frequency of which is proportional to the detected RPM of the engine, is fed through an electronic switching and noise isolation circuit 14. This circuit produces an average DC voltage level proportional to the received pulses from the wave shaper block 12. The average DC signal is applied to the difference amplifier circuitry 16 for producing an error signal at junction 18. The error signal is integrated by integrator 20 and differentiated by a differentiator 22. The error signal, its integral and its derivative are then applied to a control signal generator 24, the output of which is provided at junction 26.

A control element, the state of which is controlled by the signal at junction 26, may be constituted by any number of devices. In the case of an engine governor, the control element may be a valve controlling fuel to the engine. The position of the valve is determined by the energization state of a solenoid coil, such as, coil 28. The state of energization is, of course, a function of the average current through the coil. In order to provide a signal representative of the actual position of the valve, a feedback element, such as a potentiometer, is mechanically connected to the solenoid actuator so as to produce a feed back voltage representative of position. The feedback element 30, therefore, also applies a voltage to the junction 26. Junction 26 is the input to a difference amplifier 32, which amplifier compares the magnitude of the control signal with the magnitude of the feedback signal from the actuator potentiometer. The difference between the signals, if any, is supplied as one input to the amplifier circuit 32. A sawtooth wave oscillator 34 is applied to the other input of the difference amplifier 32 to produce a pulse width modulated signal at the output of the amplifier which determines the average current flowing through the coil 28.

The circuit thus far described and as described in greater detail in the aforementioned U.S. Pat. application, thus provides an automatic control circuit to maintain an engine or other prime mover at a regulated operating condition, for example, constant speed. Additional optional features of the circuit include the provision of an external limit override circuit 36 which can override the signal from the control signal generator 24 upon detecting selected conditions, such as, high temperature, excessive smoke, improper manifold pressure, etc; a current limiter 38 and a fault detector circuit 40, the latter ceasing operation of the circuit upon detection of engine failure.

Of particular importance to the present invention is the electronic switching circuit 14 and the difference amplifier 16. These circuits, in conjunction with a circuit now to be described, permit the automatic control circuit to cope with change in engine acceleration rate. Specifically, where a significant change in acceleration rate of a prime mover occurs, it is necessary to adjust the gain of the difference amplifier circuit 16. This is accomplished according to the invention by use of a switching arrangement including buffer circuit 42, transistors 44 and 46, and resistors 48. These components, responsive to an external switch indicated schematically at 50, will switch feedback resistor 48 in or out of the feedback circuit of the difference amplifier 16. As will be apparent, inclusion of resistor 48 in the feedback loop of the difference amplifier reduces the gain while excluding the resistor increases the gain.

Figure 2:
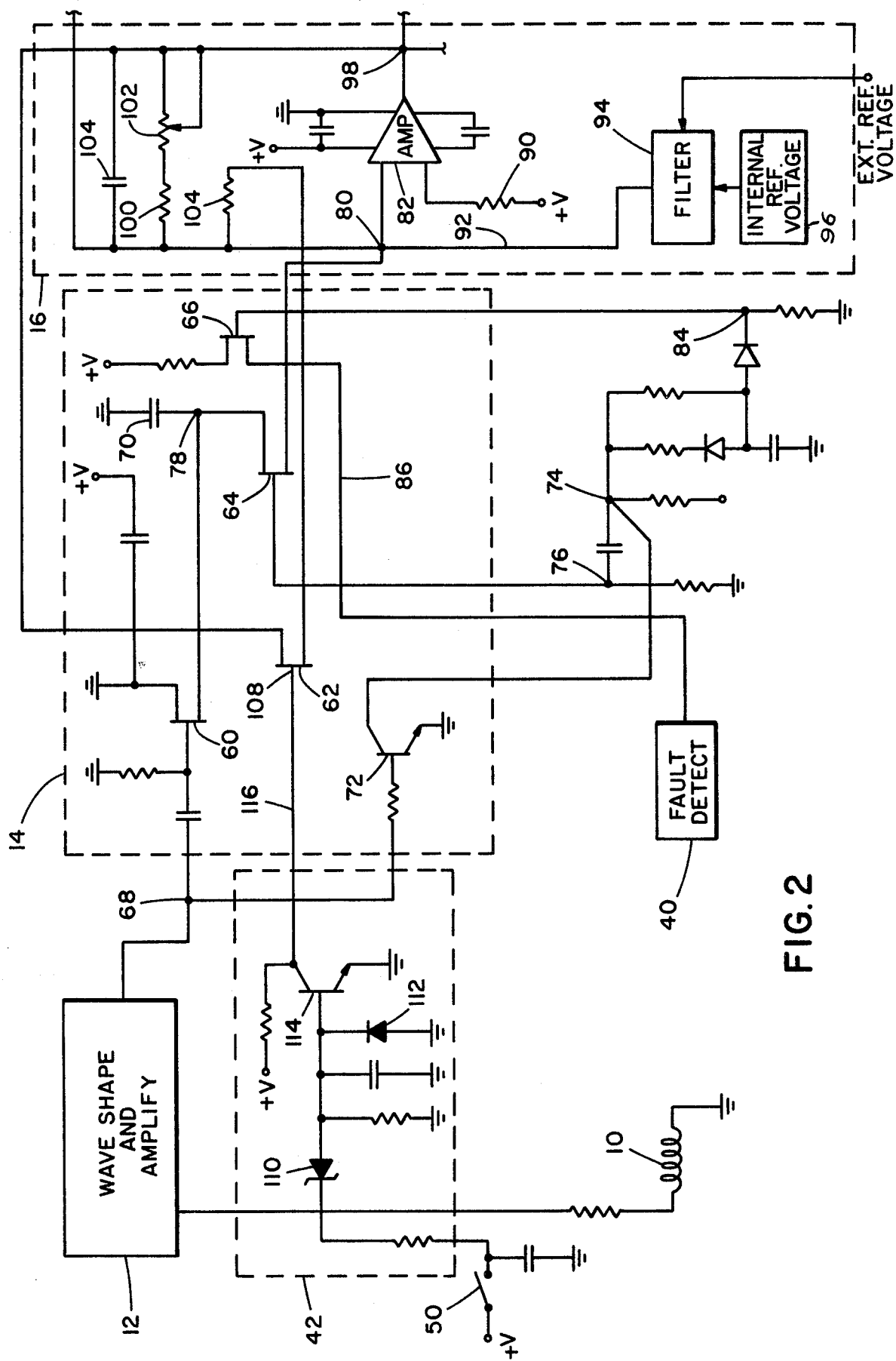
FIG. 2 is a partial schematic of the control system illustrating the details of the gain change circuitry.

Referring to FIG. 2, a portion of the FIG. 1 circuit is illustrated in schematic form, which portion includes an electronic switching block 14 and the differential amplifier circuit 16 as well as the buffer circuit 42. As described in the aforementioned U.S. Pat. application, the magnetic pick-up coil wave form is applied to the wave shaping and amplifier circuit 12. The square wave pulse which is produced therefrom is applied to the electronic switching circuit 14. Preferably, the switching circuit employs a number of electronic switching devices as, for example, FET's. A typical FET switch commercially available is a type CD4016 in which four bi-lateral switches are provided on an integrated circuit chip. These switches are shown in the drawing as field effect transistors 60, 62, 64 and 66. The pulses provided from the wave shaper 12 are received at junction 68 and are applied to switch 60 for connectinng one side of capacitor 70 to ground. Also connected to junction 68 is a further switch comprising transistor 72 for connecting junction 74 to ground. Junction 74 controls operation of switch 64 which connects junction 78 to junction 80 at the input of the operational amplifier 82. Switch 66 is controlled from junction 84 and connects line 86 to a positive reference voltage.

The purpose and function of the three switches 60, 64 and 66 is fully described in the referenced patent application. In summary, each time switch 60 is closed, the charge on capacitor 70 is removed to ground. Switching transistor 72 acts as an inverter with respect to the output signal from the wave shaper 12 and applies its inverted output to the junction 74. The switch 64 connects the capacitor 70 to the summing junction 80. The circuit described is one in which the switch means 60 conducts substantially in phase with the square wave output from wave shaper 12 removing charge from the capacitor 70 in an amount proportional to the frequency of the input signal. Because of the inverter action of the switch 72, switch 64 conducts substantially 180° out of phase with the input signal and pulsating DC current appears at the summing junction 80. This pulsating current has an average value which is proportional to the frequency of the input signal. The summing junction 80 is at a fixed voltage established by the potential source and the resistor 90 applied to the positive input.

It will be evident that the capacitor 70 is alternately charged by current flow from the summing junction 80 through the switch means 64 and then discharged to ground through switch means 60. Each cycle of charge and discharge transfers a fixed amount of stored charge causing the pulsating DC current to flow from the summing junction. The purpose of this switching arrangement is to eliminate the effect of transient signals since the voltage at the summing junction 80 is produced from a regulated source isolated by the switching arrangement from the input signals of the wave shaper 12.

In order to produce the desired error signal, the feedback signal from the summing junction is compared to a reference signal provided on line 92. The reference may be supplied through a filter circuit 94 and may be an internal reference 96 or an external reference voltage applied on terminal 98.

Regardless of the source of reference signal, the reference signal and the proportional DC signal are summed at junction 80 and applied to the negative input of operational amplifier 82. The output of amplifier 82 is provided at junction 98. Connected from the output junction 98 of the amplifier to its negative input are a number of feedback elements, which elements directly control the amplifier gain. These include resistor 100 and variable resistor 102 and capacitor 104 to smooth out the pulsating signals. Also provided in the feedback circuit is a feedback resistor 104. It is by alternately switching resistor 104 into and out of the feedback circuit that the gain of the system is altered. One side of resistor 104 is connected to the summing junction 80. The other side of the resistor is connected to switch 62. The output of switch 62 is connected via line 106 to the junction 98 at the amplifier output. The control gate 108 of switch 62 is connected to the buffer circuit 42.

It will be seen that closing external switch 50 produces an output from the buffer circuit 42 effective for disabling switch 62. This, in turn, removes resistor 104 from the feedback path of the amplifier 82 significantly increasing the amplifier gain. When switch 50 is open, the reverse conditions exist, namely, switch 62 is closed, resistor 104 is in the feedback path of amplifier 82 and the gain is significantly lower.

Referring to the details of buffer circuit 42, a Zener diode 110 is employed to reduce noise while diode 112 prevents negative transients from causing false triggering of inverting transistor 114. When switch 50 is closed, transistor 114 conducts dropping the collector from a positive voltage to ground. The collector of transistor 114, via line 116, is the control input to gate 108 of switch 62. Zero voltage on line 116 disables switch 62 for the purpose just described.

Having explained the structure and function of the gain switching circuit, it is desirable to indicate the reasons for its presence and in particular one application where its presence is highly desirable. Where a prime mover is subjected to loading conditions which vary considerably, proper operation of a control system is difficult to achieve. For example, where the inertia of the prime mover system is very high, the acceleration rate of the prime mover will be very low. That is, a correction in speed requires a relatively long period of time to effect. Under those conditions high gain from the control circuit is desirable in order to minimize this transient period.

Alternatively, where the system inertia is low and the motor can rapidly respond to any desired speed change, the control circuit gain must be lower to avoid instability and, in particular, the tendency of the control circuit to hunt for the set speed. By actuating the switch 50 in accordance with the gain requirements of the prime mover, these alternative conditions can be achieved with the present invention.

Referring to FIG. 3, a specific application of the gain switchable control circuit according to the invention is illustrated. It should be recognized that this application is merely examplary for there are many other applications of the circuit which do not employ the structure illustrated in FIG. 3. In FIG. 3 electric power from conventional means, such as a utility, is provided to an electric motor 120. This motor drives a generator 122 to produce electricity for use in a factory, etc. Such an arrangement is common where it is desired to isolate the internal power from the external source.

If, in addition, it is desired or necessary to maintain a very precise voltage and phase relationship as, for example, for use with a computer system, a heavy flywheel 124 can be provided on the output shaft 126 of the generator set. Due to the high inertia of the flywheel 124, small changes in engine speed of the electric motor are minimized and will not adversely affect the generator output.

As is often the case in critical applications, provisions are made to keep the generator set running in the event of an external power failure. This may be accomplished by use of a diesel motor, such as motor 128, connected via a clutch mechanism 130 to the shaft 126 and the flywheel. It is the motor 128 which is controlled by the automatic control system according to the present invention indicated schematically at 132. In the event of a power failure, the engine is started by using the energy in the flywheel. With clutch 130 engaged the diesel motor drives the generator shaft and flywheel. Its acceleration rate is extremely low, on the order of one-half percent per second. Under these conditions the motor control must have a high gain in order to maintain the set speed with reasonable accuracy and response time. Thus, when clutch 130 is engaged, switch 50 is closed causing switch 62 to open and remote resistor 104 from the feedback circuit.

When the external power source is restored, the diesel motor will come off line as the clutch disengages. At this point in time the load inertia of the system is very low, and the motor has an acceleration rate potential on the order of 300 percent per second. For such a situation low gain is required for the control circuit 132. Thus, the resistor 104 is switched into the feedback circuit to permit stable control of the motor. This is accomplished by opening switch 50 in conjunction with disengagement of the clutch 130.

While I have shown and described embodiments of this invention in some detail, it will be understood that this description and illustrations are offered merely by way of example, and that the invention is to be limited in scope only by the appended claims.

I claim:

1. An automatic control system for a device to be controlled such as a prime mover comprising
   (a) means for detecting an operating condition of said controlled device and generating a proportional signal,
   (b) amplifier means receiving said proportional signal and producing an error signal representative of the difference between the detected condition and a preset value thereof for controlling said device,
   (c) means for switching the gain of said amplifier means between at least two preset values, and
   (d) means for controlling said switching means in accordance with load conditions on the controlled device.

2. The system according to claim 1 wherein said load condition is the acceleration rate of said prime mover.

3. The system according to claim 2 wherein said control means includes a switch which is closed when the acceleration rate of the prime mover is low to produce higher amplifier means gain and is opened when the acceleration rate of the prime mover is high to produce lower gain.

4. The system according to claim 3 wherein said switch is selected from the group comprising mechanical contact switch, relay contact and mercury switch.

5. The system according to claim 1 wherein said amplifier means is an operational amplifier connected as a difference amplifier.

6. The system according to claim 5 wherein the gain of said operational amplifier is controlled by the feedback resistance connected from its output to its input.

7. The system according to claim 1 wherein said switching means includes
   (a) a resistor connected in the feedback path of said amplifier means,
   (b) a transistor switch in series with said resistor for effectively adding and removing said resistor from the feedback path to change the gain of said amplifier means, said transistor switch being controlled by said control means.

8. The system according to claim 7 further including means for buffering the signal from said control means to said transistor switch to eliminate noise.

9. The system according to claim 8 wherein said buffering means includes a transistor in emitter follower configuration operating said transistor switch.

10. In an automatic control system having means for detecting an operating condition of a controlled device, and amplifier means for producing an error signal representative of the difference between the detected condition and a preset value thereof, the improvement comprising:
    means for switching the gain of said amplifier means between at least two preset values,
    means for controlling said switching means in accordance with load conditions on the controlled device.

* * * * *